United States Patent [19]
Herbst

[11] Patent Number: 6,030,566
[45] Date of Patent: Feb. 29, 2000

[54] METHOD AND APPARATUS FOR UNLOADING PLASTIC MATERIAL PRODUCTS FROM A PLASTIC MATERIAL INJECTION MOLDING MACHINE

[76] Inventor: Richard Herbst, Freisinger Strasse 3b, D-85386 Eching, Germany

[21] Appl. No.: 08/994,395

[22] Filed: Dec. 19, 1997

[30] Foreign Application Priority Data

Dec. 21, 1996 [DE] Germany .......................... 196 53 778

[51] Int. Cl.⁷ .................................................. B29C 45/72
[52] U.S. Cl. ................... 264/237; 264/238; 264/328.14; 425/507; 425/548; 425/556
[58] Field of Search ..................... 264/237, 238, 264/296, 328.14, 348; 198/952; 425/509, 507, 515, 436 R, 436 RM, 547, 548, 555, 556

[56] References Cited

FOREIGN PATENT DOCUMENTS 94 02 931 U    1/1994    Germany .

*Primary Examiner*—Jill L. Heitbrink
*Attorney, Agent, or Firm*—Knobbe, Martens, Olson & Bear, LLP

[57] ABSTRACT

A method and an apparatus for unloading plastic material products from a plastic material injection molding machine are disclosed. The method comprises the steps of unmolding the products from a mold of the injection molding machine and, after the step of unmolding, cooling the products on two product surfaces by contacting the two product surfaces with two corresponding cooling surfaces of a cooling apparatus. The apparatus is provided with corresponding unmolding devices and cooling plates.

23 Claims, 3 Drawing Sheets

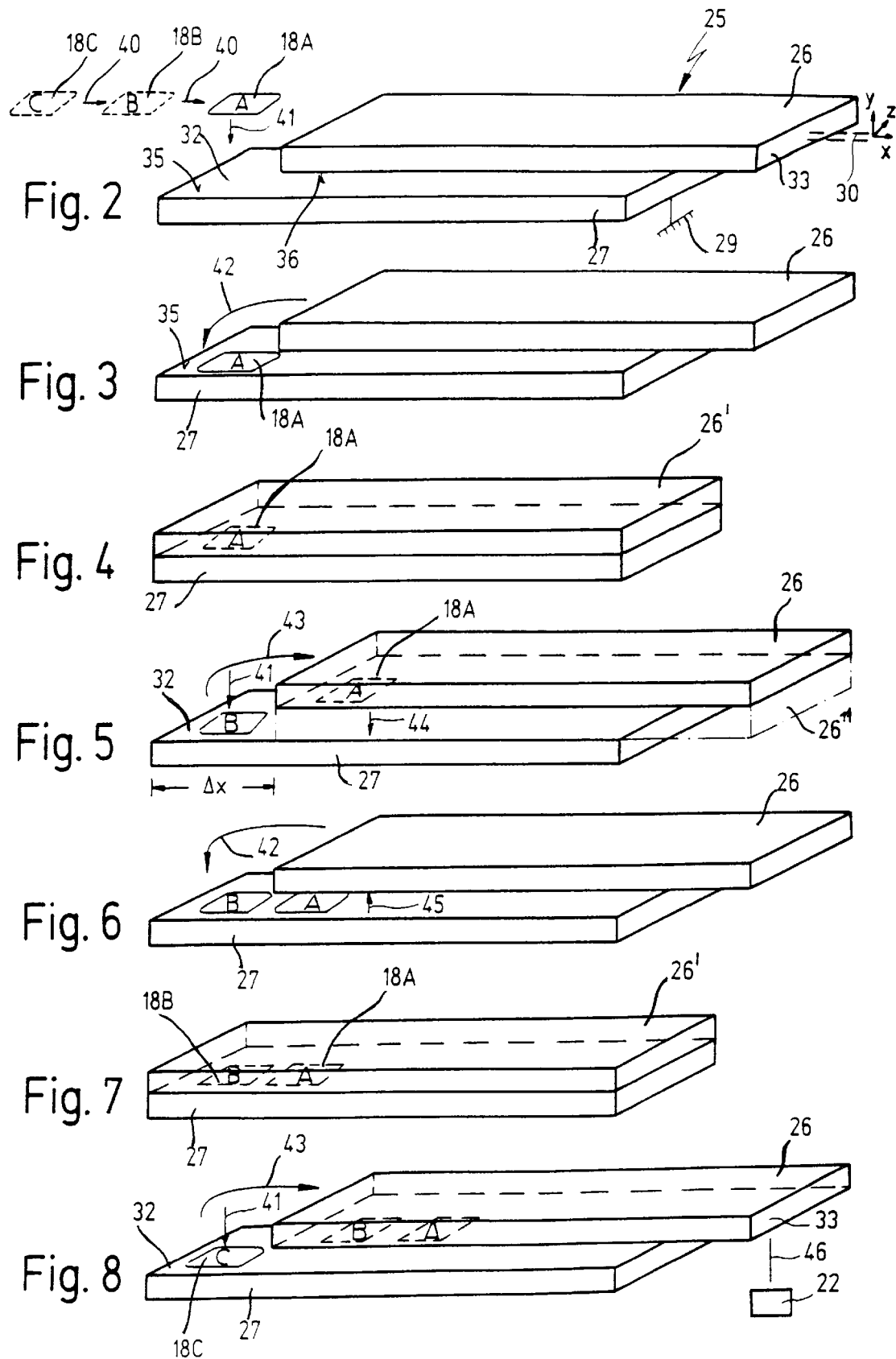

METHOD AND APPARATUS FOR UNLOADING PLASTIC MATERIAL PRODUCTS FROM A PLASTIC MATERIAL INJECTION MOLDING MACHINE

FIELD OF THE INVENTION

The invention relates, generally, to the field of plastic material injection molding.

More specifically, the invention is related to a method and an apparatus for unloading plastic material products from a plastic material injection molding machine, wherein the products are unmolded from a mold of the injection molding machine and are cooled thereafter.

BACKGROUND OF THE INVENTION

During the injection molding of plastic material products the granule is plastified by heating-up same to a temperature in the order of between 250 and 300° C. The molten plastic material is then injected into a cavity of a mold.

After the injection of the molten plastic material into the cavity or into a plurality of cavities of the mold the plastic material cools down more or less quickly, typically in a period of time of between 1.5 and 20 seconds. The decrease of temperature during this cooling-down depends on a variety of parameters, for example the kind, size and design of the mold, the presence or absence of a cooling system within the mold etc.

As soon as the molten plastic material has cooled down within the mold to a predetermined temperature, wherein the predetermined temperature is set such that the injected plastic material product has a stability sufficient for subsequent unmolding, the so-called unmolding time has been attained, this time being defined as a moment in time at which the unmolding process may be initiated.

In order to achieve the utmost efficiency of the very expensive plastic material injection molding machines, it is a particular object in the art to make the cycle time between the moment in time of injection and the moment in time of unmolding as short as possible.

Therefore, a variety of methods and apparatuses have been suggested allowing to unmold the plastic material product as soon as possible and to cool same down outside the mold so that the mold may be used again as soon as possible for a subsequent injection process.

In an apparatus of the afore-mentioned kind as disclosed in German utility model 94 02 931 the plastic material products are unloaded from the mold by means of a gripper device comprising a coolable gripper plate. The gripper plate engages the plastic material product with a form fit and is pressed against same. For that purpose the gripper plate is provided with cooling bores allowing the flow of a cooling agent therethrough.

This prior art apparatus is particularly intended to be used for the handling of large area, thin-walled plastic material products, for example covers and bottoms of compact disc boxes.

It is a disadvantage of this prior art apparatus that the cooling device for the just unmolded plastic material products is solely provided on the handling system for the unloading of the plastic material products. Accordingly, the gripper of the handling system is occupied for a relatively long period of time, being the period of time necessary to cool down the plastic material product such that it may be taken from the cooled gripper plates without the risk of mechanic deformations.

Although the prior art apparatus offers a partial solution of this problem in that the handling system is provided with a plurality of coolable gripper plates, the plurality being twice in number as the number of the cavities within the mold so as to make only one half of the gripper plate active during a first cycle and to use the other half during the subsequent cycle so that, seen as a whole, twice the cooling time is available, these measures are accompanied by an essential complication of the design. This, again, results in an increased control circuitry, increased costs but, also, increased handling problems because a much more complex handling system must be inserted into and withdrawn from the plastic material injection molding machine during each cycle.

Furthermore, the prior art apparatus does not allow to set longer cooling times without, in turn, extending the cycle time of the plastic material injection molding machine.

Finally, the prior art apparatus has the disadvantage that the just unmolded, flat plastic material products may only be applied to the coolable gripper plates on one of their sides. This may result in a deformation, in particular in connection with very thin-walled plastic material products because that surface of the plastic material products being applied to the cooled gripper plate will cool down more quickly and will, therefore, also shrink more quickly as compared to the surface facing away from the gripper plate. Due to these circumstances the plastic material products may become bulged and may, hence, be useless under certain circumstances.

It is, therefore, an object underlying the invention to improve a method and an apparatus of the kind mentioned at the outset so that the afore-mentioned disadvantages are obviated. In particular, it shall be possible to shorten the cycle time of the plastic material injection molding machine without incurring deteriorations in the quality of the plastic material products.

SUMMARY OF THE INVENTION

The afore-mentioned and other objects are solved by a method for unloading plastic material products from a plastic material injection molding machine, the method comprising the steps of:
  unmolding the products from a mold of the injection molding machine; and
  after the step of unmolding cooling the products on at least two product surfaces by contacting the at least two product surfaces with at least two corresponding cooling surfaces of a cooling apparatus.

The object is, further, solved by an apparatus for unloading plastic material products from a plastic material injection molding machine, the apparatus comprising:
  a device for unmolding the products from a mold of the injection molding machine; and
  a device for cooling the products after the step of unmolding on at least two product surfaces by contacting the at least two product surfaces with at least two corresponding cooling surfaces of a cooling apparatus.

The object is, further, solved by the subject matter of any of the appended dependent claims.

The object underlying the invention is thus entirely solved.

For, according to the invention the plastic material products are cooled down by cooling same on two sides so that the plastic material product will be homogeneously cooled down from two sides and, hence, may not become bulged or bended. When somewhat thicker plastic material products are manufactured, the invention avoids the well-known effect that a plastic material product having just been unmolded from the mold will re-melt within certain surface areas because the heat stored within the interior of the plastic material product will flow to a non-cooled surface and will again melt same.

If, further, a flat plastic material product is cooled between two cooling surfaces, the risk of the formation of condensation due to a drastic cooling-down is substantially reduced. As is generally known, condensation occurs on a surface, for example the surface of a flat plastic material product, when the temperature of the surface falls below the so-called dew point. The dew point is typically at 14° C. It is, therefore, possible to avoid the formation of condensation by setting the temperature of the surface above the dew point at any time. At least, it is possible, according to the invention, to at least reduce the formation of condensation by enclosing the plastic material product on all sides so that there are no free surfaces. This holds true in particular in the case when flat plastic material products are enclosed between two cooling surfaces, as described above. In that case only the very narrow sides of the plastic material product lie open.

In a particularly preferred embodiment of the invention the products are essentially flat-shaped and the product surfaces are a top surface and a bottom surface and extend essentially parallel to each other.

This measure has the advantage that large-surfaced and flat plastic material products, for example the above-mentioned compact disc boxes, may be manufactured with small cycle times in a plastic material injection molding machine.

In other embodiments of the invention being particularly preferred, the plastic material products are displaced stepwise between the cooling surfaces. For that purpose cooling surfaces are provided on cooling plates and at least one of the cooling plates is adapted to be displaced relative to another one of the cooling plates and is, further, provided with means for holding the products.

These measures have the advantage that the dwell time of the plastic material products between the two cooling plates may be set as long as desired so that the plastic material products may be cooled down to such an extent that they may be further processed with relatively simple and robust systems and may, for example, be stacked, packed or the like.

When doing so, it is preferred to displace the products between the cooling surfaces along a linear path. For that purpose the cooling plates are adapted to be displaced relative to each other such that the products may be picked-up from a first cooling surface on a first one of the cooling plates under the action of the holding means disposed on a second one of the cooling plates and may then be displaced by a predetermined step on the first cooling plate cooling surface. Still more preferably the plastic material products are displaced along a linear path stepwise on the cooling surface of the other cooling plate.

These measures have the advantage that by means of an extremely simple mode of displacement the plastic material products may "wander" between the cooling plates. It goes, however, without saying that other paths of displacement may be used, for example meander-like paths or other paths between the cooling plates.

In this case it is further preferred when the products are charged to the cooling apparatus at a front end of a cooling surface and are dispensed from the cooling apparatus at a back end of a cooling surface. For that purpose a transfer station is disposed at a front end of a cooling plate and a stacking station is disposed at a back end of a cooling plate.

These measures have the advantage that the cooling device according to the invention may be integrated without problems into a flow-production line where the still relatively warm and soft plastic material products are charged on one end thereof and may be discharged from the opposite end as cooled-down and mechanically stable plastic material products for then being further processed.

Another advantageous effect may be achieved when the products have a predetermined three-dimensional contour on at least one of the product surfaces, the corresponding cooling surface in that case being contoured complementarily relative to the contoured product surface.

These measures have the advantage that also plastic material products having a relatively irregular surface may be reliably cooled down. To a certain extent a post-processing in the meaning of a shaping may thus be achieved during cooling down.

According to further embodiments of the invention the cooling surfaces are applied against the product surfaces under a predetermined pressure. For that purpose at least one of the cooling plates is connected to a displacement device for allowing pressing the cooling plates together.

This holds particularly true when the pressure is applied on the product surfaces along a predetermined two-dimensional distribution. When doing so, an embossing action may be executed during the application of pressure on the product surfaces.

Finally, a particularly good result is achieved when a predetermined two-dimensionally distributed cooling treatment is executed on the product surfaces by the cooling surfaces.

These measures have the advantage that the cooling action may be substantially improved because the thermal transition between the plastic material products and the cooling plates may be essentially improved. Furthermore, as already mentioned, it is also possible to effect a certain post-treatment of the plastic material products, for example in the meaning that inspite of the shrinking accompanying the cooling-down of the plastic material products the exterior shape thereof is maintained. For example the shrinking action may be influenced by properly setting a temperature profile along the cooling surface. For example, if a plate is first cooled down at its periphery and then at its center, the plate is maintained in a plane configuration by itself. Furthermore, by using the aforementioned measures, it is also possible to return an already deformed product into its desired shape by inversely deforming the still soft product through an appropriate profiling of the applied pressure and/or temperature. The term "thermal treatment" shall be understood to also include the possibility to also increase the temperature within certain surface areas even if, generally, a cooling-down is intended. If cooling surfaces are applied to surfaces of the plastic material product under pressure, it is preferred to concurrently press another item into the still soft mass of the plastic material product. The term "item" shall be understood to include, for example, an electronic chip or a mechanical item, for example a threaded sleeve, a hinge or the like.

According to still another preferred modification of this embodiment first plastic material products are picked up by one of the cooling surfaces and are brought into contact with second plastic material products for connecting said plastic material products together. For doing so the cooling plates are adapted to be displaced relative to each other such that two plastic material products are disposed one above each other.

These measures have the advantage that another function may be executed within the cooling device, namely a fitting of several plastic material items. It goes without saying that the entire manufacturing process may thus be speeded up.

According to still further preferred embodiments of the invention the holding devices comprise vacuum devices. Preferably, the vacuum devices comprise a nozzle for ejecting an air flow directed onto one of the product surfaces such that the product is held by means of a vacuum generated by a Venturi effect of the nozzle.

This measure, known per se from sheet metal handling has the advantage that the plastic material products may be reliably held and displaced with extremely simple means.

Further advantages will become apparent from the description and the enclosed drawing.

It goes without saying that the features explained before and those which will be explained hereinafter may not only be used in the particularly given combination but also in other combinations or alone without leaving the scope of the present invention.

BRIEF DESCRIPTION OF THE DRAWINGS

Embodiments of the invention are shown in the drawing and will be explained in further detail throughout the subsequent description.

FIGS. 2–8 show schematic phases of displacement for two cooling plates of the plastic material injection molding machine of FIG. 1;

DETAILED DESCRIPTION OF THE PREFERRED EMBODIMENTS

Figure 1:
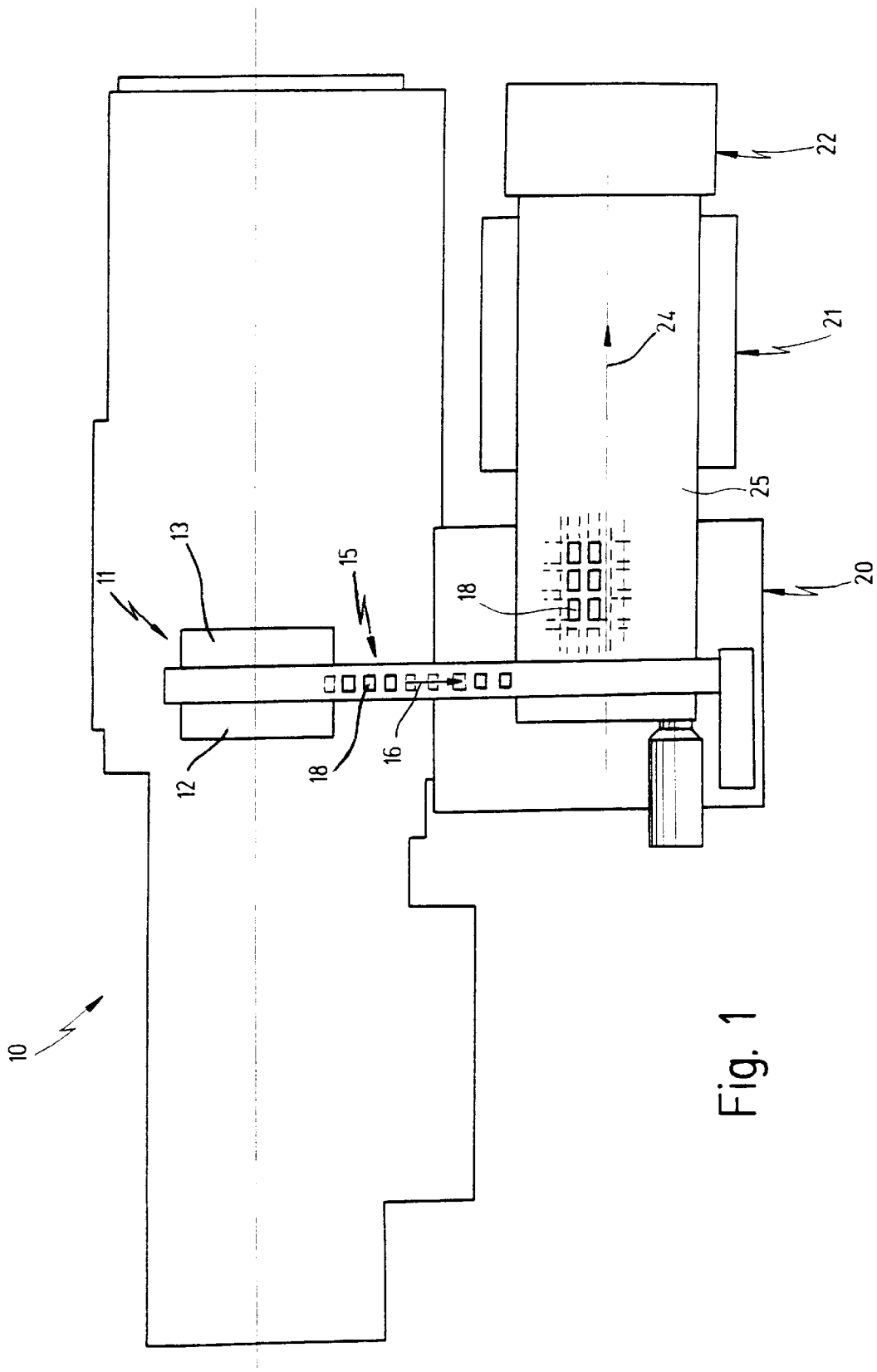
FIG. 1 in an extremely schematic top plan view shows a plastic material injection molding machine as may be used in the context of the present invention.

In FIG. 1, reference numeral 10 generally indicates a plastic material injection molding machine of basically conventional design. Machine 10 comprises a mold 11 with two mold portions 12, 13 being shown only extremely schematically.

For discharging or unloading injected plastic material products from mold 11 in its opened state a handling system is provided being generally indicated by reference numeral 15. Handling system 15 discharges the plastic material products as soon as they are unmolded from mold 11 and displaces same in the direction of an arrow 16 out of plastic material injection molding machine 10. The plastic material products are indicated by reference numeral 18.

Besides plastic material injection molding machine 10 a transfer station 20, a cooling station 21 and a stacking station 22 are arranged one after the other. Stations 20, 21 and 22 are passed by plastic material products 18 one after each other as will be explained in further detail. Transfer station 20 shall only be understood as an example, it may even not be necessary as the case may be.

Transfer station 20 discharges plastic material products 18 from handling system 15 in their still warm and unstable state and places same on a cooling apparatus 25 of cooling station 21. When the plastic material products 18 have passed through cooling station 21 (arrow 24) they arrive at stacking station 22 where they are stacked and, as the case may be, also packed.

The operation of cooling apparatus 25 shall now be described in further detail along FIGS. 2–8;

As can be seen in FIG. 2 cooling apparatus 25 comprises an upper cooling plate 26 as well as a lower cooling plate 27. Whereas lower cooling plate 27 is connected to a stationary base 29 and is, hence, immobile, upper cooling plate 26 is connected to a displacement unit 30. Displacement unit 30 allows a displacement of upper cooling plate 26 relative to lower cooling plate 27, for example along Cartesian coordinates x, y and z. Hence, any conceivable displacement of upper cooling plate 26 relative to lower cooling plate 27 is possible. As an alternative, the upper cooling plate may be arranged stationary and the lower cooling plate may be made displaceable or both cooling plates may also be displaceable relative to each other.

It goes, however without saying that other displacement units may be used for effecting a relative displacement between cooling plates 26 and 27.

Plastic material products 18A, 18B and 18C are fed from transfer station 20 to a front end 32 of lower cooling plate 27. This happens preferably in the order of a series in the direction of arrow 24 in FIG. 1. Still more preferably, a plurality of such rows or series may be arranged one besides each other as indicated schematically in FIG. 1.

After having passed through cooling station 21 plastic material products 18A, 18B, 18C . . . leave the area of cooling plates 26, 27 at a back end 33 of upper cooling plate 26, as will be explained in more detail below.

Lower cooling plate 27 is provided with an upper cooling surface 35, whereas upper cooling plate 26 has a lower cooling surface 36. Cooling surfaces 35, 36 are, hence, directed against each other. They extend essentially parallel. Cooling surfaces 35, 36 may be designed by appropriate means (not shown) such that a predetermined pressure profile and/or a predetermined temperature profile may be set along the respective surface two-dimensionally. For that purpose certain surface areas may be configured elastically by means of inner actuators. For generating specific temperature profiles along the surface, cooling channels may be distributed along the surface accordingly. In certain cases it may be necessary to also care for a re-heating-up on particular locations of the surface by a short-term temperature rise, as may be obtained by means of appropriate heating channels or heaters.

As shown in FIG. 2, plastic material products 18A, 18B, 18C are fed to cooling plates 26, 27 in the direction of arrow 40, having the same direction as arrow 24 in FIG. 1. The foremost plastic material product 18A is now located above the front end 32 of lower cooling plate 27 and will now be lowered on same (arrow 41). During that phase of displacement, upper cooling plate 26 is in the position shown in FIG. 2 where it is retracted in the direction of arrow 40 by a predetermined step relative to lower cooling plate 27 and is upwardly distant from the latter.

As soon as first plastic material product 18 lies on cooling surface 35 of lower cooling plate 27 (FIG. 3), upper cooling plate 36 is lowered opposite to the direction of arrow 40 to left hand side and downwardly (arrow 42).

As shown in FIG. 4, upper cooling plate 26 now lies in a position 26' on lower cooling plate 27 so that first plastic material product 18A is enclosed between both cooling plates 26' and 27. As plastic material product 18A ajoins cooling surfaces 35, 36 of cooling plates 26, 27 with its two large surface areas in the position of FIG. 4, it is intensively cooled down and is concurrently secured against deformation, for example against bulging. However, with the same means a deformation having occurred previously may again by corrected by re-deforming the deformed plastic material product into its original flat state.

A holding device arranged in upper cooling plate 26' (not shown in FIG. 4 and 5) and adapted to cooperate with the first plastic material product 18A is now activated, as will be described in further detail below together with the description of FIG. 9. Upper cooling plate 26 is now again lifted upwardly and is displaced along the direction of arrow 40 by a step Δx (arrow 43) for then being lowered again (arrow 44). Upper cooling plate 26 is now in a third operational position 26". First plastic material product 18A in that third operational position is now again enclosed between the two cooling plates 26" and 27 and is cooled concurrently. Front end 32 of lower cooling plate 27 now lies free again so that a second plastic material product 18B may be placed thereon from above (arrow 41). Next, the holding device provided in upper cooling plate 26 is deactivated for first plastic material product 18A. Upper cooling plate 26 is now lifted upwardly (arrow 45), as shown in FIG. 6, and is displaced against the direction of arrow 40 in a forward direction and is then again lowered onto lower cooling plate 27 (arrow 42).

As shown in FIG. 7, upper cooling plate 27 is now again in its position 26' (cf. FIG. 4) where it is flush with lower cooling plate 27. Cooling plate 26" and 27 now enclose both plastic material products 18A and 18B.

For making the next step, holding devices provided in upper cooling plate 26 and adapted to cooperate with both plastic material products 18A, 18B are again activated and upper cooling plate 26 is again lifted upwardly and displaced in reward direction (arrow 43) as shown in FIG. 8. Now, a third plastic material product 18C may be placed on front end 32 of lower cooling plate 27 (arrow 41).

The steps discribed before may now be repeated cyclically. As can easily be seen, plastic material products 18A, 18B, 18C . . . wander in the direction of arrows 40 (x-direction) between the two cooling plates 26, 27 from the left hand side to the right hand side in the Figures, until they come to back end 33 of upper cooling plate 26 one after the other. From that position they may be taken away (arrow 46) and may be fed to stacking station 22.

When executing the steps shown in FIGS. 2–8, one will certainly take care to make the illustrated open times between cooling plates 26 and 27 as short as possible and to enclose plastic material products 18 between cooling plates 26, 27, lying one above each other, as long as possible.

The sequence of displacement steps shown results in a linear path of plastic material products 18A, 18B, 18C . . . between cooling plates 26 and 27. However, the sequence of displacement steps may also be varied and another path of displacement may be chosen, for example a meander-like path or a path being otherwise shaped. If, for example, instead of the afore-described and linearly displaceable cooling plates 26 and 27 a rotating table or two oppositely rotating tables are used, the displacement path may, of course be circular, helical or the like.

Figure 9:
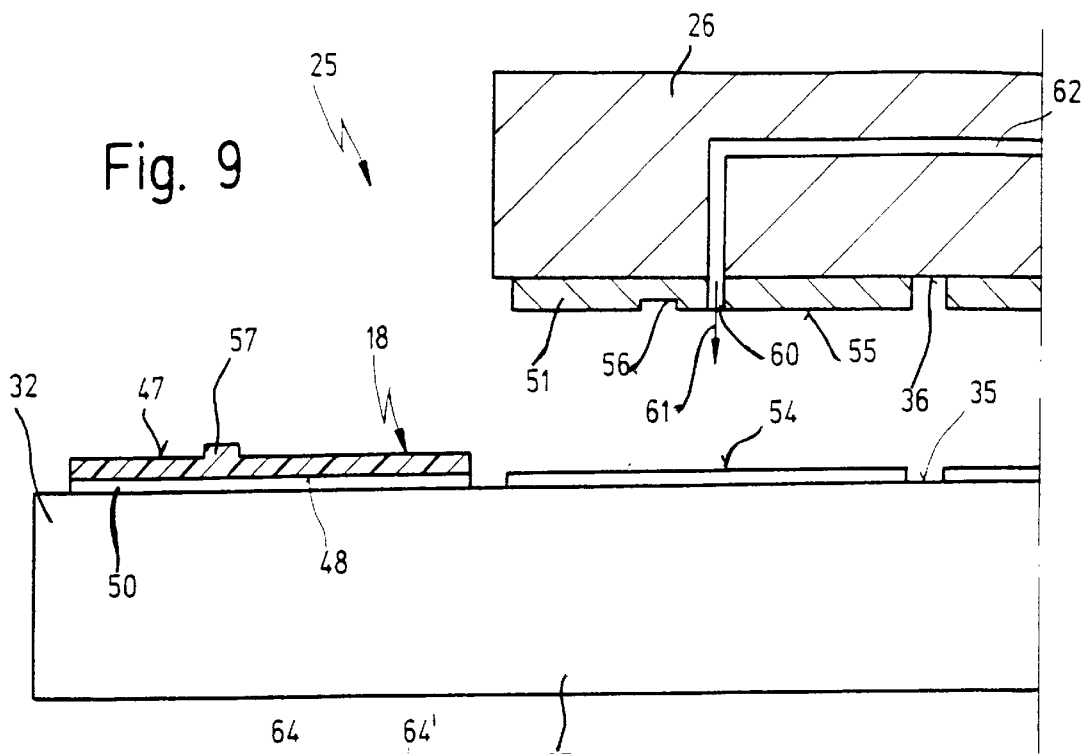
FIG. 9 in extremely enlarged scale shows, in a side-elevational view and partially broken away, a section of two cooling plates as are shown in FIGS. 2–8.

FIG. 9 shows further details of the arrangement of FIG. 2–8.

As can be seen, plastic material product 18 has an upper surface 47 and a lower surface 48. For receiving plastic material product 18 on lower cooling plate 27 a lower support 50 is provided whereas upper cooling plate 26 is provided with a corresponding upper support 51.

Lower supports 50 have a plane surface 54 because lower surface 48 of plastic material products 18 is plane, too.

In contrast, surface 55 of upper support 51 is contoured, more specifically, it is provided with a recess 56, corresponding to a protrusion 57 on upper surface 47 of plastic material product 18.

For lifting-off plastic material products 19 from lower cooling plate 27 by means of upper cooling plate 26 a vacuum device is provided. The vacuum device essentially comprises a nozzle 60 opening into the center of surface 55 of upper support 51. Nozzle 60 ejects an air flow 61 because nozzle 60 is connected with an appropriate pressurized air supply (not shown) via a channel 62. The Venturi-effect, thus created, forms a vacuum between surface 55 and plastic material product 19 so that plastic material product 19 may be held against the action of gravity.

As soon as upper cooling plate 26 of FIG. 9 has been displaced to the left hand side and has been lowered downwardly, such that plastic material product 18 will be engaged by upper support 51, air flow 61 is started. By doing so, plastic material product 18 is sucked against upper support 51 and may be taken away together with it.

Figures 10, 11:
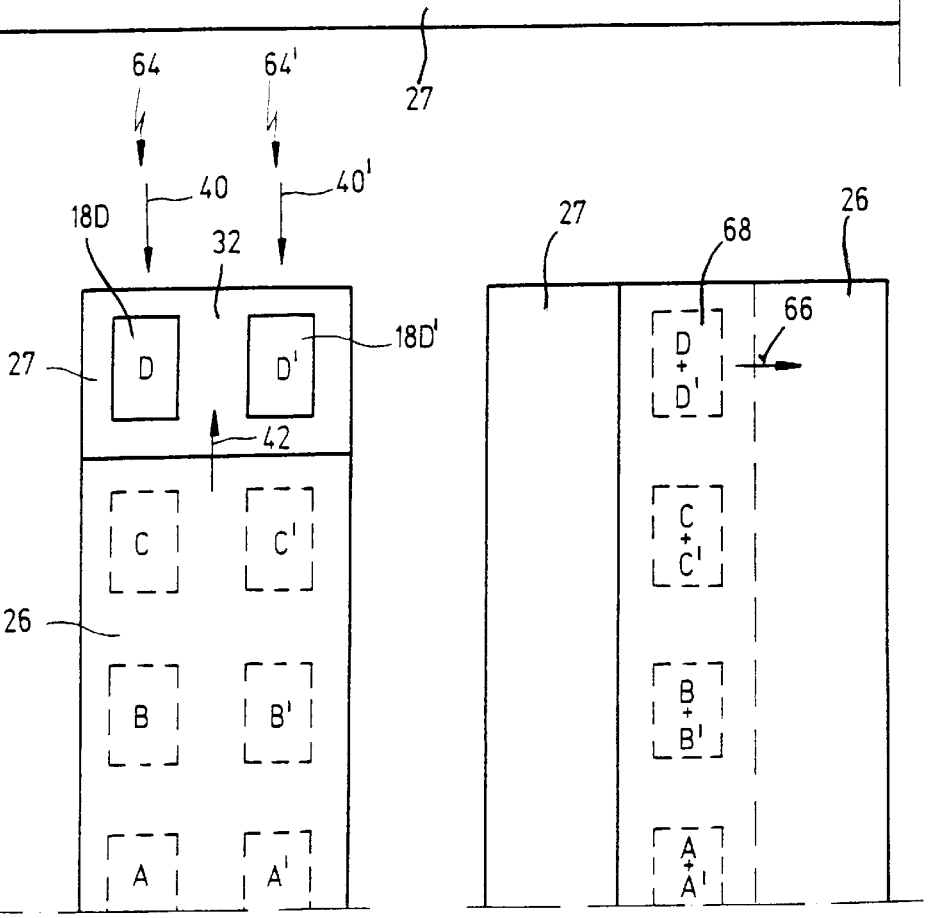
FIGS. 10 and 11 show another top plan view on two cooling plates in two distinct operational positions according to a further embodiment of the invention.

FIG. 10 and 11 who another embodiment of the invention.

As can be seen, plastic material products 18 may be charged in the direction of arrow 40 and 40' along two parallel rows 64 and 64' on front end 32 of lower cooling plate 27.

In FIG. 10 the left hand row is designated by A, B, C, D whereas the right hand row is designated with A', B', C' and D'. The products in rows 64 and 64' are complementary with the respect to each other such that they may be fitted together subsequently. The products may, for example, be the lower half and the upper half of a compact disc box.

It may now be assumed that the products 18D and 18D' are fed on front end 32. Upper cooling plate 26 is now displaced in a forward direction with all its holding devices non-activated (arrow 42) and is subsequently lowered onto any products which are in the position shown in FIG. 10.

Now, the holding devices accorded to the products within the left hand row A, B, C, D are activated and upper cooling plate 26 is subsequently displaced to the right hand side (arrow 66 in FIG. 11) until corresponding products A/A', B/B', C/C' and D/D' are disposed one above each other. Upper cooling plate 26 is now lowered downwardly. When doing so, a certain pressure is exerted so that the corresponding products are fitted together. Thus, products 68 are created, each consisting of two portions.

What is claimed is:

1. A method for unloading plastic material products from a plastic material injection molding machine, the method comprising the steps of:

unmolding said products from a mold of said injection molding machine; and cooling said products on at least two product surfaces by contacting said at least two product surfaces with at least two corresponding cooling surfaces of a cooling apparatus, wherein first plastic material products are picked up by one of said cooling surfaces and are brought into contact with second plastic material products for connecting said plastic material products together.

2. The method of claim 1, wherein said products are essentially flat-shaped, said product surfaces being a top surface and a bottom surface and extending essentially parallel to each other.

3. The method of claim 1, further comprising displacing said products stepwise between said cooling surfaces.

4. The method of claim 3, wherein said products are displaced between said cooling surfaces along a linear path.

5. The method of claim 3, further comprising charging said products to said cooling apparatus at a front end of a cooling surface and dispensing said products from said cooling apparatus at a back end of a cooling surface.

6. The method of claim 1, wherein said products have a predetermined three-dimensional contour on at least one of said product surfaces, said corresponding cooling surfaces being contoured complementarily relative to said contoured product surface.

7. The method of claim 1, further comprising applying said cooling surfaces against said product surfaces under a predetermined pressure.

8. The method of claim 7, further comprising pressing an item into said product during said application under pressure.

9. The method of claim 7, further comprising applying said pressure on said product surfaces along a predetermined two-dimensional distribution.

10. The method of claim 7, further comprising executing an embossing action during said application of pressure on said product surfaces.

11. The method of claim 1, further comprising executing a predetermined two-dimensionally distributed cooling treatment on said product surfaces by said cooling surfaces.

12. A method of cooling plastic material products formed by a plastic material injection molding machine, comprising the steps of:
   unmolding said products from a mold of said injection molding machine;
   contacting at least two product surfaces with at least two corresponding cooling surfaces of a cooling apparatus for cooling the products; and
   displacing said products from one cooling surface to another cooling surface and along a length of said cooling surfaces.

13. The method of claim 12, wherein the displacing of the products between two cooling surfaces occurs in an alternating manner.

14. The method of claim 12, wherein the displacing of the products along a length of said cooling surfaces occurs in a stepwise manner.

15. The method of claim 14, further comprising charging said products to said cooling apparatus at a front end of a cooling surface and dispensing said products from said cooling apparatus at a back end of a cooling surface.

16. An apparatus for unloading plastic material products from a plastic material injection molding machine, the apparatus comprising:
   means for unmolding said products from a mold of said injection molding machine; and
   means for cooling said products after said step of unmolding on at least two product surfaces by contacting said at least two product surfaces with at least two corresponding cooling surfaces of a cooling apparatus, wherein
   said cooling surfaces are disposed parallel to each other,
   said cooling surfaces are disposed on cooling plates, at least one of said cooling plates being adapted to be displaced relative to another one of said cooling plates and being provided with means for holding said products, and
   said cooling plates are adapted to be displaced relative to each other such that said products may be picked up from a first cooling surface on a first one of said cooling plates under the action of said holding means disposed on a second one of said cooling plates and may then be displaced by a predetermined step on said first cooling plate cooling surface.

17. The apparatus of claim 16, wherein said products may be displaced on said first cooling plate cooling surface along a linear path.

18. The apparatus of claim 17, wherein a transfer station is disposed at a front end of a cooling plate, a stacking station being disposed at a back end of a cooling plate.

19. The apparatus of claim 16, wherein said products have a predetermined three-dimensional contour on at least one of said product surfaces, said corresponding cooling surface being contoured complementarily relative to said contoured product surface.

20. An apparatus for unloading plastic material products from a plastic material injection molding machine, the apparatus comprising:
   means for unmolding said products from a mold of said injection molding machine; and
   means for cooling said products after said step of unmolding on at least two product surfaces by contacting said at least two product surfaces with at least two corresponding cooling surfaces of a cooling apparatus, wherein at least one of said cooling plates is connected to displacement means for allowing pressing said cooling plates together, and said cooling plates are adapted to be displaced relative to each other such that two plastic material products are disposed one above each other.

21. The apparatus of claim 20, wherein said cooling surfaces are disposed on cooling plates, at least one of said cooling plates being adapted to be displaced relative to another one of said cooling plates and being, further, provided with means for holding said products.

22. The apparatus of claim 21, wherein said holding means comprise vacuum means.

23. The apparatus of claim 22, wherein said vacuum means comprises a nozzle for ejecting an air flow directed onto one of said product surfaces such that said product is held by means of a vacuum generated by a venturi effect of said nozzle.

* * * * *